(12) United States Patent
Koch et al.

(10) Patent No.: US 8,183,333 B2
(45) Date of Patent: May 22, 2012

(54) SLURRY PHASE POLYMERISATION PROCESS

(75) Inventors: Benoit Koch, Hannut (BE); Daniel Marissal, Carry le Rouet (FR); Marc Parisel, Vilvoorde (BE); Brent R Walworth, Sint-Niklaas (BE); Andre Frederich, Brussels (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 170 days.

(21) Appl. No.: 12/733,378

(22) PCT Filed: Aug. 29, 2008

(86) PCT No.: PCT/EP2008/061369
§ 371 (c)(1),
(2), (4) Date: Feb. 25, 2010

(87) PCT Pub. No.: WO2009/030644
PCT Pub. Date: Mar. 12, 2009

(65) Prior Publication Data
US 2010/0174037 A1 Jul. 8, 2010

(30) Foreign Application Priority Data
Sep. 3, 2007 (EP) .................................... 07253479

(51) Int. Cl.
*C08F 2/00* (2006.01)
*C08F 4/00* (2006.01)
*C08F 110/02* (2006.01)

(52) U.S. Cl. ............... 526/64; 526/65; 526/90; 526/352

(58) Field of Classification Search .................... 526/64, 526/65, 352, 90
See application file for complete search history.

(56) References Cited

U.S. PATENT DOCUMENTS 6,204,344 B1    3/2001   Kendrick et al.
2005/0272891 A1* 12/2005  Fouarge et al. ............... 526/943

FOREIGN PATENT DOCUMENTS

WO      WO 99/47251 A1    9/1999

OTHER PUBLICATIONS

Form PCT/IB/326, Notification Concerning Transmittal of International Preliminary Report on Patentability, mailed Mar. 18, 2010; PCT International Application No. PCT/EP2008/061369; International Filing Date Aug. 29, 2008 (7 pgs).

* cited by examiner

*Primary Examiner* — William Cheung
(74) *Attorney, Agent, or Firm* — Nixon & Vanderhye

(57) ABSTRACT

Polymerisation process in which polyethylene is produced in slurry in a polymerisation reactor in the presence of a Ziegler Natta catalyst and an activator, and a stream or slurry containing the polymer is withdrawn from the reactor and transferred to a flash tank operating at a pressure and temperature such that at least 50 mol % of the liquid or non-polymer component of the stream entering the flash tank or slurry is withdrawn from the flash tank as a vapour and at least 98 mol % of the vapour withdrawn from the flash tank is capable of being condensed at a temperature of between 15 and 50° C., without compression. A by-product suppressor, which reduces the amount of by-product formed per unit of polyethylene produced by at least 10%, compared with an identical polymerisation process where the by-product suppressor is not present, is used in the reactor. The molar ratio of the by-product suppressor added to the reactor to titanium added to the reactor is between 0.2 and 1.

20 Claims, No Drawings

SLURRY PHASE POLYMERISATION PROCESS

This application is the U.S. national phase of International Application No. PCT/EP2008/061369 filed 29 Aug. 2008 which designated the U.S. and claims priority to European Application No. 07253479.5 filed 3 Sep. 2007, the entire contents of each of which are hereby incorporated by reference.

The present invention is concerned with olefin polymerisation in slurry phase reactors.

Slurry phase polymerisation of olefins is well known wherein an olefin monomer and optionally olefin comonomer are polymerised in the presence of a catalyst in a diluent in which the solid polymer product is suspended and transported.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts.

Polymerisation is typically carried out in loop reactors, which are of a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of each loop reactor of a multiple reactor system can vary but is typically in the range 10-200 $m^3$, more typically 50-120 $m^3$. The loop reactors employed in the present invention are of this generic type.

Typically, in the slurry polymerisation process of polyethylene for example, the slurry in the reactor will comprise the particulate polymer, the hydrocarbon diluent(s), (co) monomer(s), catalyst, chain terminators such as hydrogen and other reactor additives In particular the slurry will comprise 20-80 weight percent (based on the total weight of the slurry) of particulate polymer and 80-20 weight percent (based on the total weight of the slurry) of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

The slurry is pumped around the relatively smooth path endless loop reaction system at fluid velocities sufficient to maintain the polymer in suspension in the slurry and to maintain acceptable cross-sectional concentration and solids loading gradients. Slurry is withdrawn from the polymerisation reactor containing the polymer together with the reagents and inert hydrocarbons, all of which mainly comprise inert diluent and unreacted monomer. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer. The reagents and hydrocarbons need to be separated from the polymer and recovered for economic, safety and environmental reasons, and many processes for achieving this are known in the art. These processes generally involve depressurising and devolatilising the polymer-containing stream after it has been withdrawn from the polymerisation reactor. The diluent and unreacted monomer can then be recompressed back into liquid form and recycled back into the reactor, whilst the solid polymer can be transferred for further processing.

A well-known disadvantage of the above process for separating and recycling the liquid components withdrawn from the reactor with the polymer is that recompressing them back into liquid form after they have been vaporised in the separation process requires considerable energy. Thus for single reactor operations, alternatives have been proposed such as in WO 99/47251 where the majority of the liquid components withdrawn with the polymer are separated in a flash tank at a temperature and pressure such that they can be recondensed just by cooling, without recompression. The remaining liquid components not removed by this process are separated in a second flash tank operating at a lower pressure, and these need to be recompressed in order to be recycled. The advantage of this process, which is referred to hereinafter as a "medium pressure flash" process, is that only a small proportion of the vaporised liquid components need to be recompressed in order to be recondensed.

Whilst the above "medium pressure flash" process has been found to be suitable in single reactor polymerisations, it is nevertheless dependent for its success on the composition of the slurry withdrawn from the reactor system and depressurised. If the content of unreacted monomer, hydrogen and other light components in the slurry withdrawn from the reactor is too high, it will not be possible to flash at a temperature and pressure which would allow both vaporisation of a substantial portion of those components and also recondensation thereof (using an economically viable coolant such as water) without compression. In such a case it would still be necessary to recompress the vaporised components in order to recycle them to the reactor.

We have found that it is possible to improve control the composition of the slurry withdrawn from the reactor so as to ensure that the above "medium pressure flash" process can operate without the need for compression, by adding a by-product suppressor to the reactor.

Accordingly, in a first aspect the invention provides a polymerisation process in which polyethylene is produced in slurry in a polymerisation reactor in the presence of a Ziegler Natta catalyst and an activator, and a stream or slurry containing the polymer is withdrawn from the reactor and transferred to a flash tank operating at a pressure and temperature such that at least 50 mol % of the liquid or non-polymer component of the stream entering the flash tank or slurry is withdrawn from the flash tank as a vapour and at least 98 mol %, more preferably at least 98.5 mol %, and most preferably at least 99.5 mol %, of the vapour withdrawn from the flash tank is capable of being condensed at a temperature of between 15 and 40° C. without compression, wherein a by-product suppressor, which reduces the amount of by-product formed per unit of polyethylene produced by at least 10%, and preferably the absolute amount of by-product formed in the reactor by at least 10%, compared with an identical polymerisation process where the by-product suppressor is not present, is used in the reactor.

Usually the amount of by-product formed is measured as a production rate in kg/h, and hence the reduction is usually calculated by reference to such a production rate.

A "by-product suppressor" is a compound which suppresses the formation of by-products during the polymerisation reaction, by which is meant that it reduces the amount of by-product formed per unit of polyethylene produced, such that the ratio of by-product to polyethylene is reduced by at least 10%, preferably at least 20% (compared with an identical polymerisation where the by-product suppressor is not present). Preferably the by-product suppressor also reduces the absolute amount of by-product produced by at least 10%, preferably at least 20% (compared with an identical polymerisation where the by-product suppressor is not present). We have found that by introducing such a compound into the reactor, it is possible to reduce the proportion of components having a molecular weight below 50 in the reactor and hence also in the flash tank. As explained above, an excess of such light components in the slurry which is passed to the flash tank can make it difficult to recondense the flashed vapour without first compressing it. Usually the by-product suppressor acts by reducing the rate of formation in the reactor of one or more products other than polyethylene by at least 10%, preferably at least 20%, (compared with an identical polymerisation where the by-product suppressor is not present).

Preferably the by-product suppressor also enhances the polymerisation activity. In particular, it is preferred that the by-product suppressor increases the polymerisation activity by at least 10%, preferably at least 20%, compared with an identical polymerisation where the by-product suppressor is not present.

Preferably at least 80 mol %, more preferably 90 mol %, most preferably 95 mol % of the liquid component of the slurry is withdrawn from the flash tank as a vapour.

Components of the slurry which have a molecular weight below 50 g/mol ("$C_{lights}$") are typically all hydrocarbon components containing 3 carbon atoms or less, including ethylene, propylene, methane, ethane, propane and hydrogen. It is preferred that the by-product suppressor reduces the concentration at least one of the components in the slurry which has a molecular weight below 50 by at least 5 mol %, preferably at least 10 mol %.

In order to ensure that at least 98 mol % of the vapour withdrawn from the flash tank is capable of being condensed without compression, it is preferred that the concentration in the slurry entering the flash tank of components having a molecular weight below 50 g/mol, $C_{lights}$ (mol %), satisfies the equation $C_{lights} < 7 + 0.07(40-T_c) + 4.4(P_c-0.8) - 7(C_{H2}/C_{Et})$ where $T_c$ and $P_c$ are respectively the temperature (in °C.) and pressure (MPa g) at the location where the vapour withdrawn from the flash tank is condensed, and $C_{H2}$ and $C_{Et}$ are the molar concentrations in the flash tank of hydrogen and ethylene respectively.

It is preferred that the concentration of components having a molecular weight below 50 g/mol in the slurry entering the flash tank is controlled solely by controlling that concentration in the reactor. Accordingly it is preferred that the concentration in the reactor of components having a molecular weight below 50 g/mol also satisfies the equation $C_{lights} < 7 + 0.07(40-T_c) + 4.4(P_c-0.8) - 7(C_{H2}/C_{Et})$ where $C_{lights}$, $C_{H2}$, and $C_{Et}$ in this case are the concentrations of components having a molecular weight below 50 g/mol, hydrogen and ethylene respectively in the reactor. More preferably the concentration of components having a molecular weight below 50 g/mol in the reactor is the same as the concentration of components having a molecular weight below 50 g/mol entering the flash tank.

The by-product suppressor is preferably something which reduces the concentration and/or suppresses the formation of one or more compounds having a molecular weight below 50 g/mol. An example of a by-product suppressor is a halogenated hydrocarbon, and more particularly a chloromethane of the formula $CH_xCl_{4-x}$ where x is an integer from 1 to 3.

In an alternative aspect, the present invention provides a polymerisation process in which polyethylene is produced in slurry in a polymerisation reactor in the presence of a Ziegler Natta catalyst and an activator, and a stream or slurry containing the polymer is withdrawn from the reactor and transferred to a flash tank operating at a pressure and temperature such that at least 50 mol % of the liquid or non-polymer component of the stream entering the flash tank or slurry is withdrawn from the flash tank as a vapour and at least 98 mol %, more preferably at least 98.5 mol %, and most preferably at least 99.5 mol %, of the vapour withdrawn from the flash tank is capable of being condensed at a temperature of between 15 and 40° C. without compression, wherein a halogenated hydrocarbon, preferably a chloromethane of the formula $CH_xCl_{4-x}$ where x is an integer from 1 to 3, is used in the reactor.

In both aspects of the invention, it is preferred that a stream containing the polymer is withdrawn from the reactor and transferred to a flash tank operating at a pressure and temperature such that at least 50 mol % of the non-polymer component of the stream entering the flash tank is withdrawn from the flash tank as a vapour. Usually the stream exits the reactor as a slurry of which the non-polymer component in in the liquid phase. By the time the stream enters the flash tank however, most if not all of the non-polymer component is in the vapour phase.

In both aspects of the invention, the most preferred chloromethane is chloroform, $CHCl_3$. The use of a halogenated hydrocarbon is preferred because it has the dual effect of both suppressing ethane formation and also enhancing polymerisation activity. Ethane formation adds to the concentration of light reagents in the reactor, and therefore if not removed would make it more difficult to avoid the need to compress the vapour flashed from the flash tank in order to recondense it. In fact ethane is normally purged from the reactor, but this results in an associated loss of ethylene. Reducing the amount of ethane formed in the first place permits a reduction in the amount of ethane purged, and hence a reduction in the amount of ethylene lost. Ethane formation can be particularly significant when making low molecular weight polymers, particularly if hydrogen is present. It can also be desirable to boost the activity of the catalyst since the high hydrogen concentration can contribute to a reduction in polymerisation activity. Halogenated hydrocarbons such as chloroform can therefore provide a double benefit, by boosting activity boost and also minimising the concentration of $C_{lights}$ in the second reactor.

The amount of by-product suppressor added is usually based on the amount of Ziegler-Natta catalyst, and is preferably such that the molar ratio of the by-product suppressor added to the reactor to titanium added to the reactor is greater than 0.1, preferably between 0.2 and 1.

In one embodiment of the invention, the concentration of components having a molecular weight below 50 g/mol in the slurry entering the flash tank is additionally controlled by a post-polymerisation treatment, in which the conditions between the reactor and the flash tank are controlled to ensure that further polymerisation takes place before entering the flash tank, thereby consuming some of the components having a molecular weight below 50 g/mol. The object of the post-polymerisation stage is to reduce the concentration of components having a molecular weight below 50 g/mol in the slurry whilst minimizing the effect on the final product properties. The residence time, temperature and slurry velocity are controlled to achieve the reduction required in the concentration of these components whilst avoiding blockage or fouling in the post-polymerisation zone. In order to achieve the required degree of polymerisation, it is preferred that in this embodiment the residence time of the slurry in the post-polymerisation zone between the reactor and the flash tank is at least 20 seconds, preferably at least 5 minutes and more preferably between 10 and 30 minutes. Typically residence times of 15-25 minutes are employed. The post-polymerisation zone may be provided in the form of an agitated tank; however it is most preferred that it is in the form of an expanded diameter transfer line between the second reactor and the flash tank, which provide essentially plug flow rather than "continuous stirred tank-like" reaction conditions. The volume of the expanded diameter portion of the transfer line is typically between 1 m$^3$ and 35 m$^3$, preferably between 5 and 25 m$^3$. Its preferred length to internal diameter is preferably between 100 and 1000, more preferably between 250 and 600. It is also preferred that the internal diameter is between 200 and 1000 mm, most preferably between 500 and 750 mm. The residence time is preferably installed upstream of a hydrocyclone, the slurry pressure let-down valve and the in-line slurry heater.

In an alternative embodiment of the invention, the concentration of components having a molecular weight below 50 g/mol in the slurry entering the flash tank is additionally controlled either by introducing additional liquid into the slurry as it passes through the transfer line between the reactor and the flash tank, and/or by adjusting the solids concentration of the slurry as it passes through said transfer line. The additional liquid which may be introduced is usually inert diluent having a lower concentration of components with a molecular weight below 50 ($C_{lights}$) than that of the slurry withdrawn from the reactor, and preferably a $C_{lights}$ level that is 25-50% of the $C_{lights}$ level in the slurry itself. The $C_{lights}$ of the additional liquid is preferably less than 1 mol %, most preferably 0 mol %. The solids concentration of the slurry may be adjusted by passing the slurry through a hydrocyclone located in the transfer line: the solids-rich stream is passed to the flash tank and the solids-lean stream is recycled either upstream in the transfer line or back to the reactor.

The above embodiments of the invention involving post-reactor treatment of the slurry leaving the reactor make it possible to increase the activity in the reactor by increasing the concentration therein of reactants such as ethylene as well as by adding a by-product suppressor which may additionally enhance activity, without compromising the ability to avoid recompression of the liquid vaporised in the first flash tank.

In all embodiments of the invention, and referring either to the flash tank and/or the reactor as discussed above, it is generally preferred that the concentration of components having a molecular weight below 50 satisfies the equation $C_{lights} < 7 + 0.07(40-T_c) + 4.4(P_c-0.8) - 7(C_{H2}/C_{Et})$ where $C_{lights}$, $C_{H2}$, $C_{Et}$, P and $T_c$ are as defined previously and refer either to the reactor or the flash tank depending on the particular embodiment of the invention.

It is preferred that the polyethylene made in the reactor is a multimodal polyethylene having a shear ratio of at least 15, generally between 15 and 50, and preferably between 21 and 35. By "shear ratio" is the ratio of the high load melt index HLMI of the polyethylene to the MI$_5$ of the polyethylene. The HLMI and MI$_5$ are measured according to ISO Standard 1133 at a temperature of 190° C. using loads of 21.6 kg and 5 kg respectively. MI$_2$ is similarly measured but using a load of 2.16 kg.

The HLMI of the multimodal polyethylene exiting the reactor is preferably between 1 and 100 g/10 min, and more preferably between 1 and 40 g/10 min.

Typically the multimodal polyethylene is made in at least two reactors in series, one of which is the reactor to which the by-product suppressor is added. Although it may be made in more than two reactors, it is most preferred that the multimodal polyethylene is a bimodal polymer made in two reactors in series, with the by-product suppressor being added to either reactor. However this does not exclude the possibility that up to 10 wt % of a third polymer may be made between the two reactors. It also does not exclude the possibility of polymerisation taking place prior to the first reactor, for example in a prepolymerisation reaction. The first polymer made in the first reactor may be a low molecular weight (LMW) polymer and the second polymer made in the second reactor may be a high molecular weight (BMW) polymer, or vice versa. In one embodiment, 30-70 wt % and more preferably 40-60 wt % of a low molecular weight (LMW) polymer is made in the first reactor, and 70-30 wt % and more preferably 60-40 wt % of a high molecular weight (HMW) polymer is made in the second reactor. The most preferred range of ratios of the HMW and LMW polymers is 45-55 wt % to 55-45 wt %. The terms "low molecular weight" (LMW) and "high molecular weight" (BMW) are intended to be relative terms, in that the LMW polymer has a lower molecular weight than the HMW polymer; there is no limit on the absolute molecular weights which may be made in each reactor.

In a preferred embodiment, the HMW polymer is made in suspension in the first reactor and the LMW polymer is made in suspension in the second reactor in the presence of the first polymer, the ratios of each polymer preferably being 30-70 wt % and 70-30 wt % respectively. The following requirements apply to this embodiment only.

In this embodiment of the invention ("HMW-LMW"), it is preferred that the by-product suppressor is added to the second LMW reactor. It is also preferably ensured that the concentration of components having a molecular weight below 50 in the second LMW reactor satisfies the equation $C_{lights} < 7 + 0.07(40-T_c) + 4.4(P_c-0.8) - 7(C_{H2}/C_{Et})$ by ensuring the ratio of the average activity in the second LMW reactor to the average activity in the first HMW reactor is from 0.25 and 1.5. Average activity is typically higher in the first reactor (where a copolymer is usually made to obtain the HMW product) than in the second reactor (where a homopolymer or high density polymer is usually made to obtain the LMW product), and we have found that as a consequence the ratio of average activities between the reactors has to be controlled within these ranges in order to control the concentration of light components in the second reactor. The average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)]. If no additional catalyst is added to the second reactor, when calculating the ratio of average activities the flow rate of catalyst in the two reactors is considered to be the same. If additional catalyst is added to the second reactor, the flow rate into the second reactor is considered to be the sum of the flowrate of catalyst from the first reactor plus the flowrate of additional fresh catalyst added directly into the second reactor. Alternatively, activity in each reactor may be calculated based on catalyst residues in the polymer produced in each reactor, as is well known, and the activity ratio calculated from this.

The residence time is defined as the mass of the polymer in the reactor (kg)/the output rate of polymer from the reactor (kg/hr). In a case where polymer is recycled back into the reactor, for example when a hydrocyclone is employed downstream of the reactor, the output rate of polymer is the net output rate (ie polymer withdrawn less polymer recycled).

Preferably the overall productivity of the process is at least 10 kg polyethylene/g catalyst, preferably greater than 15 kg polyethylene/g catalyst, most preferably greater than 20 kg polyethylene/g catalyst.

In order to achieve the above ratio of average activities, it is preferred that the ratio of ethylene concentration (in mol %) in the second reactor to that in the first reactor is 5 or less.

Preferably the ratio of ethylene concentration in the second reactor to that in the first reactor is 3 or less, and more preferably 2.5 or less. Most preferably both ethylene concentration ratio and average activity ratio requirements are satisfied together.

In this HMW-LMW embodiment it is preferred that the actual concentration of ethylene in the second reactor is less than 8 mol %. However in order to ensure a satisfactory level of productivity, it is also preferred that the ethylene concentration is greater than 1.5 mol %, preferably greater than 2 mol %. The concentration of hydrogen in the second reactor is preferably less than 5 mol %, more preferably less than 3 mol %. The ratio of hydrogen to ethylene is preferably 0-0.5 mol/mol.

Usually each of the reactors has an internal volume greater than $10m^3$, more commonly greater than 25 $m^3$ and in particular greater than 50 $m^3$. Typical ranges are 75-200 $m^3$ and more particularly 100-175 $m^3$. In one version of the HMW-LMW embodiment of the invention the volumes of each of the reactors employed differ by less than 10%, and it is preferred that all of the volume, length and diameter of the reactors employed each independently differ by less than 10%. Most preferably in this version of the embodiment, the reactors have the same dimensions.

Thus in the HMW-LMW embodiment of the invention, in the case where the reactors differ in volume by no more than 10 vol %, it is preferred to balance the activities between the reactors and the respective cooling capacities by maintaining the temperature of the first reactor between 60 and 80° C., preferably no higher than 75° C. It is also preferred that the ratio of solids concentration in the first reactor to that in the second reactor is maintained at less than 1.0, preferably between 0.6 and 0.8, as this also assists in maintaining the balance of average activity between the two reactors within the desired range.

Generally in the HMW-LMW embodiment of the invention, the solids concentration in the final LMW reactor is at least 35 wt %, most preferably between 45 wt % and 60 wt % and the solids concentration in the HMW reactor is between 20 wt % and 50 wt %, more preferably between 25 wt % and 35 wt %. The solids concentration is the weight of polymer relative to the total weight of the slurry. In this case it is preferred to concentrate the solids transferred from the first reactor to the second reactor using a settling zone and/or hydrocyclone. A comonomer-free diluent stream may be introduced upstream of the hydrocyclone to reduce the proportion of comonomer transferred to the downstream reactor, thus increasing the density of the polymer produced in the LMW reactor.

By maintaining the preferred ratio of average activity and ethylene concentration ratio between the two reactors in the HMW-LMW embodiment, it is possible to achieve high overall space time yields (defined as production of polymer in kg/h per unit volume of reactor) and activities whilst still observing the $C_{lights}$ requirements of the invention in the flash tank. The average space time yield in all reactors combined may be maintained at greater than 100 kg/$m^3$/h, more preferably greater than 150 kg/$m^3$/h, and most preferably greater than 200 kg/$m^3$/h.

However, where a plant has been designed to operate a single catalyst or product type, the volume and dimensions of each reactor may be optimised individually for the principal grades to be produced, and thus the two reactors may be of different volumes and dimensions. These different dimensions can be utilised in order to obtain the desired balance of average activity between the two reactors in accordance with the invention, thus providing greater freedom to vary other reaction parameters. Thus in order to achieve the desired ratio of average activity between the first (HMW) and second (LMW) reactors, in an alternative embodiment of the HMW-LMW aspect of the invention, the first (HMW) reactor may have a space time yield (defined as production of polymer in kg/h per unit volume of reactor) greater than 150 kg/$m^3$/h, more preferably greater than 200 kg/$m^3$/h, and most preferably greater than 250 kg/$m^3$/h. It is also preferred in this case that the ratio of space time yield in the first (BMW) reactor to the second (LMW) reactor is greater than 1.2, most preferably greater than 1.5. This may be achieved by designing the first (HMW) reactor with a volume that is no more than 90%, preferably between 30-70%, and more preferably approximately 40-60%, of the volume of the second (LMW) reactor. In this case it is preferred that the ratio of length to diameter (LID) of the first reactor is greater than 500, preferably between 750 and 3000, and most preferably greater than 800;additionally or alternatively, the ratio of L/D of the first reactor to LID of the second reactor is greater than 1.5, most preferably greater than 2. In this reactor configuration, the average space time yield in all reactors combined may be maintained at greater than 150 kg/$m^3$/h, more preferably greater than 200 kg/$m^3$/h, and most preferably greater than 300 kg/$m^3$/h.

Alternatively, the LMW polymer is made in the first reactor and the HMW polymer in the second reactor. In this case, it is generally preferred that the by-product suppressor is added to the first LMW reactor. The following requirements apply to this embodiment only.

In this embodiment of the invention ("LMW-HMW"), it is preferably ensured that the concentration of components having a molecular weight below 50 in the second reactor satisfies the equation $C_{lights} < 7 + 0.07(40 - T_c) + 4.4(P_c - 0.8) - 7(C_{H2}/C_{Et})$ by ensuring the ratio of average activity in the second HMW reactor to average activity in the first LMW reactor is from 1.5 to 0.25. The average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)]. If no additional catalyst is added to the second reactor, when calculating the ratio of average activities the flow rate of catalyst in the two reactors is considered to be the same. If additional catalyst is added to the second reactor, the flow rate into the second reactor is considered to be the sum of the flowrate of catalyst from the first reactor plus the flowrate of additional fresh catalyst added directly into the second reactor. Alternatively, activity in each reactor may be calculated based on catalyst residues in the polymer produced in each reactor, as is well known, and the activity ratio calculated from this.

The residence time is defined as the mass of the polymer in the reactor (kg)/the output rate of polymer from the reactor (kg/hr). In a case where polymer is recycled back into the reactor, for example when a hydrocyclone is employed downstream of the reactor, the output rate of polymer is the net output rate (ie polymer withdrawn less polymer recycled).

This embodiment of the present invention is particularly applicable when the polymerisation catalyst is a Ziegler-Natta catalyst, especially if the overall productivity of the process is at least 10 kg polyethylene/g catalyst, preferably greater than 15 kg polyethylene/g catalyst, most preferably greater than 20 kg polyethylene/g catalyst.

In order to achieve the above ratio of average activity, it is preferred that the ratio of ethylene concentration (in mol %) in the second reactor to that in the first reactor is 5 or less. Most preferably both ethylene concentration ratio and ratio of average activity requirements are satisfied together. Preferably the ratio of ethylene concentration in the second reactor to that in the first reactor is 3 or less, and more preferably 2 or less.

In this LMW-HMW embodiment it is preferred that the actual concentration of ethylene in the second reactor is less than 8 mol %. However in order to ensure a satisfactory level of productivity, it is also preferred that it is greater than 2 mol %. The ethylene concentration is preferably between 2 and 5 mol %. The concentration of hydrogen in the second reactor is preferably less than 5 mol %, more preferably less than 3 mol %.

Usually each of the reactors has an internal volume greater than 10 m$^3$, more commonly greater than 25 m$^3$ and in particular greater than 50 m$^3$. Typical ranges are 75-200 m$^3$ and more particularly 100-175 m$^3$. In one version of the LMW-HMW embodiment of the invention the volume of the reactors employed each independently differ by less than 10%, and it is preferred that all of the volume, length and diameter of the reactors employed each independently differ by less than 10%. Most preferably in this version of the embodiment, the reactors have the same dimensions. Thus in the LMW-HMW embodiment of the invention, in the case where the reactors differ in volume by no more than 10 vol %, it is preferred to balance the activities between the reactors and the respective cooling capacities by maintaining the temperature of the first reactor between 70 and 110° C., preferably between 80 and 100° C. It is also preferred that the ratio of solids concentration in the first reactor to that in the second reactor is maintained at between 0.8 and 1.2, preferably between 0.9 and 1.0, as this also assists in maintaining the balance of average activity between the two reactors within the desired range.

Generally in the LMW-HMW embodiment of the invention, the solids concentration in each reactor is at least 35 wt %, most preferably between 45 wt % and 55 wt %. The solids concentration is the weight of polymer relative to the total weight of the slurry. In this case it is preferred to concentrate the solids transferred from the first reactor to the second reactor using a settling zone and/or hydrocyclone. A hydrogen-free diluent stream may be introduced upstream of the hydrocyclone to reduce the proportion of hydrogen transferred to the downstream reactor. It is most preferred to flash or fractionate the diluent transferred to the second (HMW) reactor hydrocyclone in order to minimize the hydrogen transferred to the downstream reactor.

However, where a plant has been designed to operate a single catalyst or product type, the volume and dimensions of each reactor may be optimised individually for the principal grades to be produced, and thus the two reactors may be of different volumes and dimensions. These different dimensions can be utilised in order to obtain the desired balance of average activity between the two reactors in accordance with the invention, thus providing greater freedom to vary other reaction parameters. Thus in order to achieve the desired ratio of average activity between the first (LMW) and second (HMW) reactors, in an alternative embodiment of the LMW-HMW aspect of the invention, the first (LMW) reactor may have a space time yield (defined as production of polymer in kg/h per unit volume of reactor) greater than 150 kg/m$^3$/h, more preferably greater than 200 kg/m$^3$/h, and most preferably greater than 250 kg/m$^3$/h. In this case the ratio of space time yield in the first (LMW) reactor to the second (HMW) reactor may be greater than 1.2, for example greater than 1.5. This may be achieved by designing the first (LMW) reactor with a volume that is no more than 90%, preferably between 30-70%, and more preferably approximately 40-60%, of the volume of the second (HMW) reactor. In this case it is preferred that the ratio of length to diameter (L/D) of the first reactor is greater than 400, preferably between 400 and 800; additionally or alternatively, the ratio of L/D of the first reactor to L/D of the second reactor is greater than 1.5, most preferably greater than 2.

The following comments apply to all aspects and embodiments of the invention. One general benefit of the invention is that the optimisation of reactor average activity balance, space time yields and cooling requirements, whilst at the same time minimising the $C_{lights}$ concentration in the flash tank so as to avoid the need to recompress leads to improved efficiency. This invention can enable monomer efficiencies of less than 1.015, generally less than 1.01 and preferably less then 1.006 to be achieved even when employing a space time yield of at least 100 kg/m$^3$/h, more preferably at least 150 kg/m$^3$/h, most preferably at least 200 kg/m$^3$/h in each reactor. By "monomer efficiency" is meant the weight ratio of ethylene+comonomer consumed to polymer produced.

It is preferred in all aspects of the invention that the reactor is "liquid full": in other words, there is substantially no gas- or vapour-containing headspace in the reactor.

A preferred type of reactor utilised for the polymerisations to which all aspects of the invention are applicable is a loop reactor, which is a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of one loop reactor in a multiple reactor system can vary but is typically in the range 10-200 m$^3$. It is preferred that the polymerisation reactor utilised in the present invention is loop reactors, and further that the loop reactors are liquid full.

Typical pressures employed in the loop reactor are between 0.1-10 MPa g, preferably between 3 to 5 MPa g.

The process according to the invention applies to the preparation of compositions containing ethylene homopolymers and copolymers. Ethylene copolymers typically comprise one or more alpha-olefins in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

In one embodiment of the invention, the polymer is a polyethylene resin having a density of greater than 940 kg/m$^3$ and an HLMI of from 1 to 100 g/10 min, and comprising from 35 to 60 wt % of a first polyethylene fraction of high molecular weight and from 40 to 65 wt % of a second polyethylene fraction of low molecular weight, the first polyethylene fraction comprising a linear low density polyethylene having a density of up to 935 kg/m$^3$ and an HLMI of less than 1 g/10 min, and the second polyethylene fraction comprising a high density polyethylene having a density of at least 960 kg/m$^3$, preferably at least 965 kg/m$^3$, and an MI$_2$ of greater than 100 g/10 min, and the polyethylene resin.

Typical diluents for the suspensions in each reactor include hydrocarbons having 2 to 12, preferably 3 to 8, carbon atoms per molecule, for example linear alkanes such as propane, n-butane, n-hexane and n-heptane, or branched alkanes such as isobutane, isopentane, isooctane and 2,2-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is particularly preferred as the diluent.

The operating conditions can also be such that the monomers act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation Methods of molecular weight regulation are known in the art. When using Ziegler-Natta, metallocene and tridentate late transition metal type catalysts, hydrogen is preferably used, a higher hydrogen pressure resulting in a lower average molecular weight. When using chromium type catalysts, polymerization temperature is preferably used to regulate molecular weight.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is preferably adjacent to the downstream end of a horizontal section of the loop. The operation of large diameter reactors with high solids concentrations in the slurry minimises the quantity of the principal diluent withdrawn from the polymerisation loop. Use of concentrating devices on the withdrawn polymer slurry, preferably hydrocylones (single or in the case of multiple hydrocyclones in parallel or series), further enhances the recovery of diluent in an energy efficient manner since significant pressure reduction and vaporisation of recovered diluent is avoided. Increasing the concentration of easily condensable components, for example through addition of fresh or recycle diluent, upstream of the hydrocyclone is a further means of enhancing the operating window of the final reactor and reducing the concentration of monomer depressurised to the medium pressure flash tank.

Where the final reactor of the multiple reactor system is a loop reactor, the withdrawn, and preferably concentrated, polymer slurry is depressurised, and optionally heated, prior to introduction into a primary flash vessel. The stream is preferably heated after depressurisation. As a consequence of the invention, the diluent and any monomer vapours recovered in the primary flash vessel can be condensed without recompression. They are typically then recycled to the polymerization process. Typically the pressure in the primary flash vessel is 0.5-2.5 MPa g, preferably 0.5-1.5 MPa g. The solids recovered from the primary flash vessel are usually passed to a secondary flash vessel to remove residual volatiles.

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an alumoxane or by an ionising agent as described, for example, in EP 500944A (Mitsui Toatsu Chemicals).

Ziegler-type catalysts are most preferred. Among these, particular examples include at least one transition metal chosen from groups IIIB, IVB, VB and VIB, magnesium and at least one halogen. Good results are obtained with those comprising:

from 10 to 30% by weight of transition metal, preferably from 15 to 20% by weight,
from 20 to 60% by weight of halogen, preferably from 30 to 50% by weight
from 0.5 to 20% by weight of magnesium, usually from 1 to 10% by weight,
from 0.1 to 10% by weight of aluminium, generally from 0.5 to 5% by weight, the balance generally consists of elements arising from the products used for their manufacture, such as carbon, hydrogen and oxygen. The transition metal and the halogen are preferably titanium and chlorine. Most preferred catalysts have the following composition:

Transition metal from 8 to 20% by weight
Magnesium content from 3 to 15% by weight
Chlorine content from 40 to 70% by weight
Aluminum content less than 5% by weight
Residual organic content less than 40% by weight Polymerisations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

The chromium-based catalyst is preferred to comprise a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 $m^2/g$, preferably from 400 to 550 $m^2/g$ and a volume porosity of greater than 2 cc/g preferably from 2 to 3 cc/g. Chromium-based catalysts may be used in conjunction with activators such organometallic compounds of aluminium or of boron. Preferred are organoboron compounds such as trialkylborons in which the alkyl chains comprise up to 20 carbon atoms. Triethylboron is particularly preferred.

If the catalyst employed is a metallocene catalyst, it preferably comprises a bis-tetrahydroindenyl (THI) compound. Preferably the catalyst system comprises (a) a metallocene catalyst component comprising a bis-tetrahydroindenyl compound of the general formula $(IndH_4)_2R''MQ_2$ in which each $IndH_4$ is the same or different and is tetrahydroindenyl or substituted tetrahydroindenyl, R" is a bridge which comprises a $C_1$-$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen; and (b) a cocatalyst which activates the catalyst component. Each bis-tetrahydroindenyl compound may be substituted in the same way or differently from one another at one or more positions in the cyclopentadienyl ring, the cyclohexenyl ring and the ethylene bridge. Each substituent group may be independently chosen from those of formula $XR_v$ in which X is chosen from group IVB, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted. In a particularly preferred embodiment, both indenyls are unsubstituted. R" is preferably an ethylene bridge which is substituted or unsubstituted. The metal M is preferably zirconium, hafnium or titanium, most preferably zirconium. Each Q is the same or different and may be a hydrocarbyl or hydrocarboxy radical having 1-20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl) zirconium dichloride is a particularly preferred bis tetrahydroindenyl compound.

Silica supported chromium catalysts are typically subjected to an initial activation step in air at an elevated activation temperature. The activation temperature preferably ranges from 500 to 850° C., more preferably 600 to 750° C. In the process of the invention, the first reactor of the series is supplied with catalyst and the cocatalyst in addition to the diluent and monomer, and each subsequent reactor is supplied with, at least, monomer, in particular ethylene and with the slurry arising from a preceding reactor of the series, this mixture comprising the catalyst, the cocatalyst and a mixture of the polymers produced in a preceding reactor of the series. It is optionally possible to supply a second reactor and/or, if appropriate, at least one of the following reactors with fresh catalyst and/or cocatalyst a first reactor.

The invention claimed is:

1. Polymerisation process in which polyethylene is produced in slurry in a polymerisation reactor in the presence of a Ziegler Natta catalyst and an activator, and a stream or slurry containing the polymer is withdrawn from the reactor and transferred to a flash tank operating at a pressure and temperature such that at least 50 mol % of the liquid or non-polymer component of the stream entering the flash tank or slurry is withdrawn from the flash tank as a vapour and at least 98 mol % of the vapour withdrawn from the flash tank is capable of being condensed at a temperature of between 15 and 50° C., without compression, wherein a by-product suppressor, which reduces the amount of by-product formed per unit of polyethylene produced by at least 10%, compared with an identical polymerisation process where the by-product suppressor is not present, is used in the reactor, the molar ratio of the by-product suppressor added to the reactor to titanium added to the reactor being between 0.2 and 1.

2. Process according to claim 1, wherein the by-product suppressor reduces the concentration in the reactor of at least one of the components in the slurry which has a molecular weight below 50 by at least 5% compared with an identical process where the by-product suppressor is not present.

3. Process according to claim 1, wherein the by-product suppressor is a halogenated hydrocarbon.

4. Polymerisation process in which polyethylene is produced in slurry in a polymerisation reactor in the presence of a Ziegler Natta catalyst and an activator, and a stream or slurry containing the polymer is withdrawn from the reactor and transferred to a flash tank operating at a pressure and temperature such that at least 50 mol % of the liquid or non-polymer component of the stream entering the flash tank or slurry is withdrawn from the flash tank as a vapour and at least 98 mol % of the vapour withdrawn from the flash tank is capable of being condensed at a temperature of between 15 and 50° C., without compression, wherein a halogenated hydrocarbon is present in the slurry, the molar ratio of the by-product suppressor added to the reactor to titanium added to the reactor being between 0.2 and 1.

5. Process according claim 1 or 4, wherein a stream containing the polymer is withdrawn from the reactor and transferred to a flash tank operating at a pressure and temperature such that at least 50 mol % of the non-polymer component of the stream entering the flash tank is withdrawn from the flash tank as a vapour.

6. Process according to claim 1 or 4, wherein the concentration in the stream entering the flash tank of components having a molecular weight below 50 g/mol, $C_{lights}$ (mol %), satisfies the equation $C_{lights} < 7 + 0.07(40-T_c) + 4.4(P_c-0.8) - 7(C_{H2}/C_{Et})$ where $T_c$ and $P_c$ are respectively the temperature (in ° C.) and pressure (MPa g) at the location where the vapour withdrawn from the flash tank is condensed, and $C_{H2}$ and $C_{Et}$ are the molar concentrations in the flash tank of hydrogen and ethylene respectively.

7. Process according to claim 6, wherein the concentration in the reactor of components having a molecular weight below 50 also satisfies the equation $_{lights} < 7 + 0.07(40-T_c) + 4.4(P_c-0.8) - 7(C_{H2}/C_{Et})$ where $C_{lights}$, $C_{H2}$, and $C_{Et}$ in this case are the concentrations of components having a molecular weight below 50, hydrogen and ethylene respectively in the reactor.

8. Process according to claim 6, wherein the concentration in the slurry entering the flash tank of hydrogen, ethylene and components having a molecular weight below 50 is the same as the concentration of hydrogen, ethylene and components having a molecular weight below 50 in the second reactor.

9. Process according to claim 1 or 4, wherein at least 80 mol % of the liquid component of the slurry is withdrawn from the flash tank as a vapour.

10. Process according to claim 1 or 4, wherein the polyethylene is a bimodal polymer made in two reactors in series comprising a first reactor and a second reactor, and the by-product suppressor is added to at least one of the reactors.

11. Process according to claim 10, wherein a high molecular weight (HMW) polymer is made in suspension in the first reactor and a low molecular weight (LMW) polymer is made in suspension in the second reactor in the presence of the first polymer.

12. Process according to claim 10, wherein a high molecular weight (HMW) polymer is made in suspension in the first reactor and a low molecular weight (LMW) polymer is made in suspension in the second reactor in the presence of the first polymer, and the ratio of the average activity in the second LMW reactor to the average activity in the first HMW reactor is from 0.25 and 1.5, where average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)].

13. Process according to claim 10, wherein a high molecular weight (HMW) polymer is made in suspension in the first reactor and a low molecular weight (LMW) polymer is made in suspension in the second reactor in the presence of the first polymer, and the ratio of ethylene concentration (in mol %) in the second reactor to that in the first reactor is 5 or less.

14. Process according to claim 10, wherein a high molecular weight (HMW) polymer is made in suspension in the first reactor and a low molecular weight (LMW) polymer is made in suspension in the second reactor in the presence of the first polymer, and the concentration of ethylene in the second reactor is less than 8 mol %.

15. Process according to claim 1 or 4, wherein the polyethylene is a multimodal polyethylene having a shear ratio of at least 15, where "shear ratio" is the ratio of the high load melt index HLMI of the polyethylene to the $MI_5$ of the polyethylene, both being measured according to ISO Standard 1133 at a temperature of 190° C.

16. Process according to claim 1, wherein the by-product suppressor reduces the absolute amount of by-product formed per unit of polyethylene produced by at least 10% compared with an identical polymerisation process where the by-product suppressor is not present.

17. Process according to claim 3, wherein the by-product suppressor is a chloromethane of the formula $CH_xCl_{4-x}$ where x is an integer from 1 to 3.

18. Process according to claim 17, wherein the by-product suppressor is chloroform, $CHCl_3$.

19. Process according to claim 1 or 4, wherein at least 98 mol % of the vapour withdrawn from the flash tank is capable of being condensed at a temperature of between 15 and 40° C.

20. Process according to claim 4, wherein the halogenated hydrocarbon is a chloromethane of the formula $CH_xCl_{4-x}$ where x is an integer from 1 to 3.

* * * * *